(12) United States Patent
Sperry et al.

(10) Patent No.: US 7,721,781 B2
(45) Date of Patent: May 25, 2010

(54) APPARATUS AND METHOD FOR FORMING INFLATED CHAMBERS

(75) Inventors: Charles R. Sperry, Northampton, MA (US); Suzanne Scott, Springfield, VT (US)

(73) Assignee: Sealed Air Corporation, Elmwood Park, NJ (US)

( * ) Notice: Subject to any disclaimer, the term of this patent is extended or adjusted under 35 U.S.C. 154(b) by 891 days.

(21) Appl. No.: 11/523,438

(22) Filed: Sep. 19, 2006

(65) Prior Publication Data

US 2007/0011989 A1      Jan. 18, 2007

Related U.S. Application Data

(62) Division of application No. 10/057,067, filed on Jan. 25, 2002, now Pat. No. 7,220,476.

(60) Provisional application No. 60/290,161, filed on May 10, 2001.

(51) Int. Cl.
  *B32B 37/00*  (2006.01)
(52) U.S. Cl. .................... 156/497; 156/498
(58) Field of Classification Search ............ 156/145, 156/308.2, 147, 497, 498
  See application file for complete search history.

(56) References Cited

U.S. PATENT DOCUMENTS

| | | | |
|---|---|---|---|
| 2,265,075 A | 12/1941 | Knuetter | 93/35 |
| 2,718,105 A | 9/1955 | Ferguson et al. | 53/5 |
| 3,319,538 A | 5/1967 | Bodolay et al. | 93/8 |
| 3,462,913 A | 8/1969 | Bodolay et al. | 53/183 |
| 3,596,428 A | 8/1971 | Young et al. | 53/28 |
| 3,938,298 A | 2/1976 | Luhman et al. | 53/7 |
| 4,169,002 A | 9/1979 | Larson | 156/145 |
| 4,201,031 A | 5/1980 | Wiles | 53/455 |
| 4,448,011 A | 5/1984 | Pohl | 53/512 |
| 4,512,136 A | 4/1985 | Christine | 53/410 |
| 4,545,180 A | 10/1985 | Chung et al. | 53/456 |
| 4,631,901 A | 12/1986 | Chung et al. | 53/455 |
| 4,869,048 A | 9/1989 | Boeckmann | 53/451 |
| 4,893,453 A | 1/1990 | Weikert | 53/469 |
| 5,042,663 A | 8/1991 | Heinrich | 206/522 |
| 5,070,675 A | 12/1991 | Chuan-Shiang | 53/79 |
| 5,080,747 A | 1/1992 | Veix | 156/352 |
| 5,181,365 A | 1/1993 | Garvey et al. | 53/455 |
| 5,187,917 A | 2/1993 | Mykleby | 53/434 |
| 5,210,993 A | 5/1993 | van Boxtel | 53/455 |
| 5,216,868 A | 6/1993 | Cooper et al. | 53/79 |

(Continued)

FOREIGN PATENT DOCUMENTS

DE      199 13 408 A1      3/1999

(Continued)

*Primary Examiner*—Jeff H Aftergut
(74) *Attorney, Agent, or Firm*—Thomas C. Lagaly

(57) ABSTRACT

An inflatable web, and method and apparatus for inflating the web, which generally includes two sheets having inner surfaces sealed to each other in a pattern defining a series of inflatable chambers of predetermined length, each of the chambers having at least one change in width over their length; an inflation port located at a proximal end of each chamber, the inflation ports being formed by intermittent seals between the sheets; and longitudinal flanges formed by a portion of each of the sheets that extend beyond the inflation ports and intermittent seals.

12 Claims, 7 Drawing Sheets

U.S. PATENT DOCUMENTS

| | | | | |
|---|---|---|---|---|
| 5,254,074 | A | 10/1993 | Landers et al. | 493/213 |
| 5,337,539 | A | 8/1994 | Barton | 53/413 |
| 5,339,602 | A | 8/1994 | Landers et al. | 53/410 |
| 5,353,573 | A | 10/1994 | Durrant | 53/410 |
| 5,357,733 | A | 10/1994 | Weikert | 53/455 |
| 5,427,830 | A | 6/1995 | Pharo | 428/35.2 |
| 5,441,345 | A | 8/1995 | Garvey et al. | 383/9 |
| 5,454,642 | A | 10/1995 | De Luca | 383/3 |
| 5,552,003 | A | 9/1996 | Hoover et al. | 156/147 |
| 5,581,983 | A | 12/1996 | Murakami | 53/512 |
| 5,687,545 | A | 11/1997 | Baker | 53/284.7 |
| 5,693,163 | A | 12/1997 | Hoover et al. | 156/147 |
| 5,699,653 | A | 12/1997 | Hartman et al. | 53/455 |
| 5,722,217 | A | 3/1998 | Cloud | 53/455 |
| 5,733,045 | A | 3/1998 | Jostler et al. | 383/37 |
| 5,755,082 | A | 5/1998 | Takahashi et al. | 53/511 |
| 5,824,392 | A | 10/1998 | Gotoh et al. | 428/178 |
| 5,845,463 | A | 12/1998 | Henaux | 53/450 |
| 5,862,653 | A | 1/1999 | Solano | 53/562 |
| 5,873,215 | A | 2/1999 | Aquarius et al. | 53/403 |
| 5,875,610 | A | 3/1999 | Yuyama et al. | 53/75 |
| 5,918,441 | A | 7/1999 | Baker | 53/284.7 |
| 5,937,614 | A | 8/1999 | Watkins et al. | 53/79 |
| 5,942,076 | A | 8/1999 | Salerno et al. | 156/359 |
| RE36,501 | E | 1/2000 | Hoover et al. | 156/147 |
| 6,035,611 | A | 3/2000 | Lerner | 53/455 |
| 6,058,681 | A | 5/2000 | Recchia, Jr. | 53/455 |
| RE36,759 | E | 7/2000 | Hoover et al. | 156/147 |
| 6,145,273 | A | 11/2000 | Baker | 53/284.7 |
| 6,209,286 | B1 * | 4/2001 | Perkins et al. | 53/403 |
| 6,410,119 | B1 * | 6/2002 | De Luca et al. | 428/166 |
| 6,550,229 | B2 | 4/2003 | Sperry et al. | |
| 6,598,373 | B2 | 7/2003 | Sperry et al. | |
| 6,651,406 | B2 | 11/2003 | Sperry et al. | |
| 6,659,150 | B1 * | 12/2003 | Perkins et al. | 156/378 |
| 6,786,022 | B2 | 9/2004 | Fuss et al. | |
| 6,804,933 | B2 | 10/2004 | Sperry et al. | |

FOREIGN PATENT DOCUMENTS

| | | |
|---|---|---|
| DE | 199 13 410 A1 | 3/1999 |
| WO | WO 00/53501 | 3/2000 |
| WO | WO 00/64672 | 11/2000 |
| WO | WO 01/53153 A1 | 7/2001 |
| WO | WO 01/74686 A2 | 10/2001 |
| WO | WO-01/85434 A2 * | 11/2001 |
| WO | WO 02/14156 A1 | 2/2002 |

* cited by examiner

APPARATUS AND METHOD FOR FORMING INFLATED CHAMBERS

This Application is a divisional of U.S. Ser. No. 10/057,067, filed Jan. 25, 2002, now U.S. Pat. No. 7,220,476, the disclosure of which is incorporated herein by reference, which claims the benefit of U.S. Provisional Application No. 60/290,161, filed May 10, 2001.

BACKGROUND OF THE INVENTION

This invention relates to inflatable webs that can be inflated to provide gas inflated cushioning for protective packaging applications. More particularly, this invention relates to improved inflatable webs and apparatus and process for inflating the inventive webs to provide gas inflated air cellular cushioning.

Air cellular cushioning materials are commonly used to protect articles during shipment. One such product is Bubble Wrap® air cellular cushioning sold by Sealed Air Corp. Air cellular cushioning is generally prepared at a production plant and shipped in rolls to distributors and end users. Since the rolls are bulky and have a large volume to weight ratio, shipping costs are relatively high. In addition, the large volume to weight ratio means that relatively large storage areas may be required for storing inventoried cushioning.

To address these issues, it has been proposed to provide inflatable webs shipped to an end user in a roll having a relatively low volume to weight ratio. The end user would then inflate the roll as needed. In general, such products have not been commercially significant because of the cost, complexity and reliability of the inflation equipment that is required or because of the complexity of the attendant inflation processes and techniques. These problems have, in turn, resulted in inconsistent inflation or difficulty in controlling the degree of inflation.

This invention provides inflatable webs that can be reliably and consistently inflated by end users to provide desired air cellular cushioning. The invention further provides a simplified apparatus adapted for inflation of the webs of the invention and an attendant simplified inflation method.

SUMMARY OF THE INVENTION

One aspect of the present invention is an inflatable web, comprising:

a) two sheets having inner surfaces sealed to each other in a pattern defining a series of inflatable chambers of predetermined length, each of the chambers having at least one change in width over their length;

b) an inflation port located at a proximal end of each chamber, the inflation ports being formed by intermittent seals between the sheets; and c) longitudinal flanges formed by a portion of each of the sheets that extend beyond the inflation ports and intermittent seals.

Another aspect of the invention pertains to a method of forming an inflated cushioning product, the method comprising the steps of:

a) providing an inflatable web as described above;

b) placing an inflation nozzle between the longitudinal flanges, the nozzle comprising a gas outlet port for injection of gas into the inflatable chambers;

c) moving the web and inflation nozzle relative to each other so as to cause the inflation nozzle to move longitudinally between the flanges;

d) inflating the series of chambers sequentially by the introduction of a gas into their respective inflation ports; and e) sealing the inflation port of each inflated chamber.

A further aspect of the invention is directed to an apparatus for inflating a web, comprising:

a) a mechanism for conveying the above-described inflatable web along a path of travel;

b) an inflation nozzle within the travel path and positioned for placement between the longitudinal flanges of the web, the inflation nozzle comprising a gas outlet port for injection of gas into the inflatable chambers and being adapted to position the gas outlet port closely adjacent to the inflation ports and intermittent seals so that, as the conveying mechanism conveys the web along the travel path, the inflation nozzle moves longitudinally between the flanges to inflate the series of chambers sequentially by the introduction of gas into their respective inflation ports; and c) a device for sealing the inflation ports.

These and other aspects and features of the invention may be better understood with reference to the following description and accompanying drawings.

DETAILED DESCRIPTION OF THE INVENTION

Figure 1:
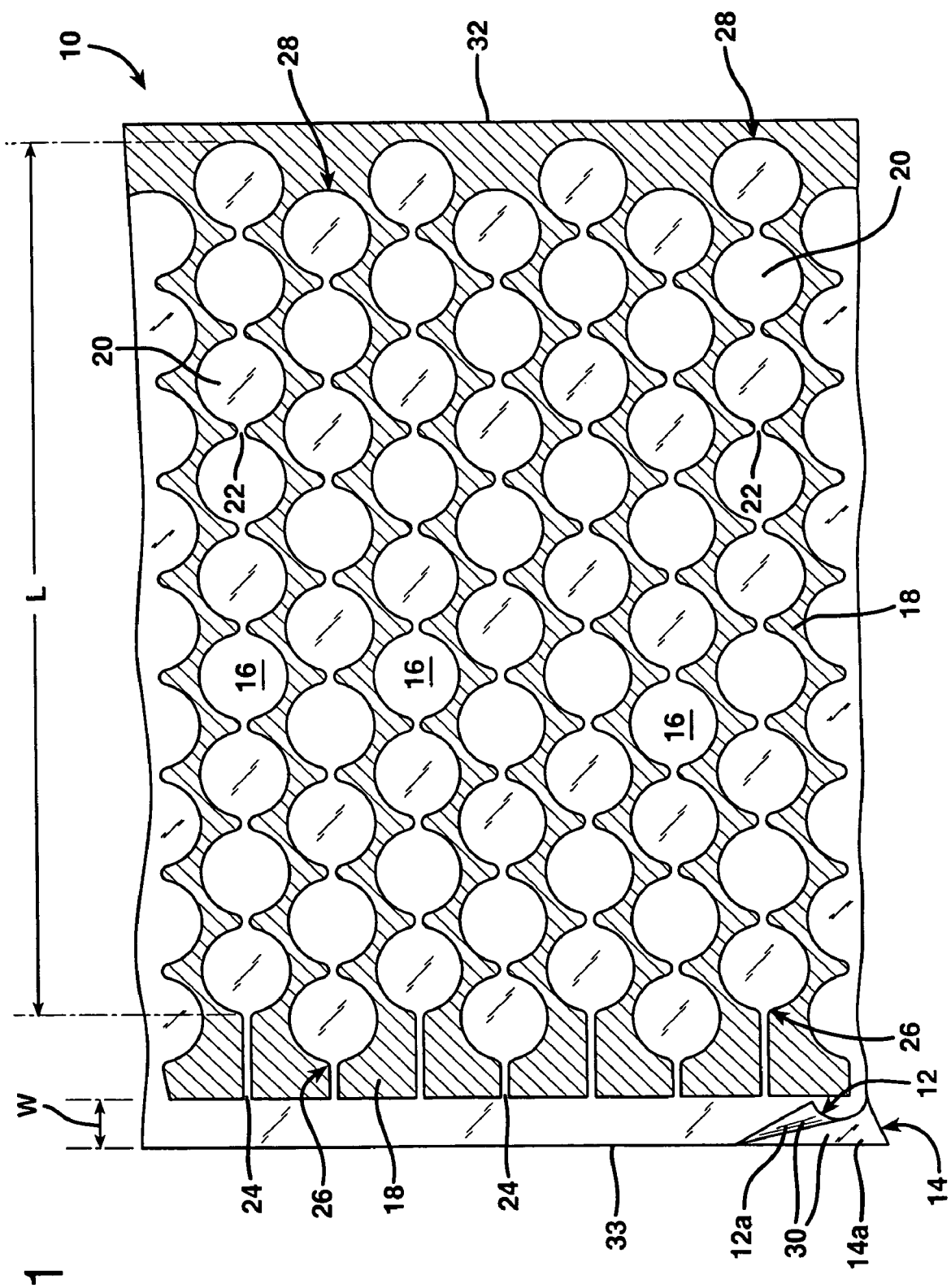
FIG. 1 is a plan view of an inflatable web of the invention.

Referring to FIG. 1, there is shown an inflatable web 10 in accordance with the present invention, comprising two sheets 12 and 14 having respective inner surfaces 12a and 14a sealed to each other in a pattern defining a series of inflatable chambers 16 of predetermined length "L." Length L may be substantially the same for each of the chambers 16, with adjacent chambers being off-set from one another as shown in order to arrange the chambers in close proximity to one another. Sheets 12 and 14 are sealed to each other in a pattern of seals 18 that defines the inflatable chambers 16 such that each of the chambers has at least one change in width over their length L. That is, seals 18 may be patterned to provide in each chamber 16 a series of sections 20 of relatively large width connected by relatively narrow passageways 22. When inflated, sections 20 may provide essentially spherical bubbles in web 10 by symmetrical outward movement of those sections of sheets 12 and 14 comprising the walls of sections 20. This will generally occur when sheets 12 and 14 are identical in thickness, flexibility, and elasticity. Sheets 12 and 14 may, however, be of different thickness, flexibility or elasticity such that inflation will result in different displacement of sheets 12 and 14, thereby providing hemispherical or asymmetrical bubbles.

Seals 18 are also patterned to provide inflation ports 24, which are located at proximal end 26 of each of the inflatable chambers 16 in order to provide access to each chamber so that the chambers may be inflated. Opposite to the proximal end 26 of each chamber is a closed distal end 28. As shown, seals 18 at proximal end 26 are intermittent, with inflation ports 24 being formed therebetween. Preferably, inflation ports 24 are narrower in width than the inflatable sections 20 of relatively large width in order to minimize the size of the seal required to close off each chamber 16 after inflation thereof.

Inflatable web 10 further includes a pair of longitudinal flanges 30, which are formed by a portion of each of sheets 12 and 14 that extend beyond inflation ports 24 and intermittent seals 18. In the embodiment shown in FIG. 1, flanges 30 extend out equally beyond ports 24 and seals 18. The flanges accordingly have equivalent widths, shown as width "W." Flanges 30, in conjunction with ports 24 and seals 18, constitute an open inflation zone in web 10 that is advantageously configured to provide rapid and reliable inflation of chambers 16. As discussed in greater detail below, the inner surfaces of flanges 30 preferably are brought into close slidable contact with outwardly facing surfaces of an appropriately configured nozzle or other inflation means so as to provide a partially closed inflation zone which promotes efficient and reliable sequential inflation of chambers 16 without restricting the movement of the web or inflation nozzle that is required to effect this sequential inflation. Flanges 30 are preferably at least ¼ inch in width and, more preferably, at least ½ inch in width. The flanges may have different widths, but it is generally preferred that they are equal in width, as shown in FIG. 1.

Preferably, the seal pattern of seals 18 provides uninflatable planar regions between chambers 16. These planar regions serve as flexible junctions that may advantageously be used to bend or conform the inflated web about a product in order to provide optimal cushioning protection. In another embodiment, the seal pattern can comprise relatively narrow seals that do not provide planar regions. These seals serve as the common boundary between adjacent chambers. Such a seal pattern is shown for example in U.S. Pat. No. 4,551,379, the disclosure of which is incorporated herein by reference. The seals 18 may be heat seals between the inner surfaces of the sheets 12 and 14. Alternatively, sheets 12 and 14 may be adhesively bonded to each other. Heat seals are preferred and, for brevity, the term "heat seal" is generally used hereinafter. This term should be understood, however, to include the formation of seals 18 by adhesion of sheets 12 and 14 as well as by heat sealing. Preferably, sheets 12 and 14 comprise a thermoplastic heat sealable polymer on their inner surface such that, after superposition of sheets 12 and 14, web 10 can be formed by passing the superposed sheets beneath a sealing roller having heated raised land areas that correspond in shape to the desired pattern of seals 18. The sealing roller applies heat and forms seals 18 between sheets 12 and 14 in the desired pattern, and thereby also forms chambers 16 with a desired shape. The sealing pattern on the sealing roller also provides intermittent seals at proximal end 26, thus forming inflation ports 24 and also effectively resulting in the formation of flanges 30. Further details concerning this manner of making web 10 are disclosed in commonly-assigned, copending patent application Ser. No. 09/934,732 entitled INTEGRATED PROCESS FOR MAKING INFLATABLE ARTICLE (Kannankeril et al.), filed on Aug. 22, 2001, the disclosure of which is hereby incorporated herein by reference.

Heat sealability of sheets 12 and 14 can be provided by employing a monolayer sheet comprising a heat sealable polymer or a multilayer sheet comprising an inner layer comprising a heat sealable polymer. In either case, inflation ports 24 preferably also comprise inner surfaces that are heat sealable to one another to allow such ports to be closed by heat sealing means after inflation of a corresponding chamber (this is described in further detail below).

Sheets 12 and 14 may initially be separate sheets that are brought into superposition and sealed or they may be formed by folding a single sheet onto itself with the heat sealable surface facing inward. The longitudinal edge opposite from flanges 30, shown as edge 32 in FIG. 1, is closed. Closed edge 32 may be formed in the web as a result of folding a single sheet to form sheets 12 and 14, whereby the fold constitutes edge 32, or by sealing individual sheets 12 and 14 in the vicinity of the longitudinal edge as part of the pattern of seals 18. Although this edge is shown as closed in FIG. 1, in other embodiments of the webs of this invention this edge may be open and comprise a pair of flanges similar to flanges 30 to provide a second open inflation zone for inflating a second series of inflatable chambers or for inflation of the chambers from both ends.

Sheets 12, 14 may, in general, comprise any flexible material that can be manipulated to enclose a gas in chambers 16 as herein described, including various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The film may be monolayer or multilayer and can be made by any known coextrusion process by melting the component polymer(s) and extruding or coextruding them through one or more flat or annular dies.

Figure 2:
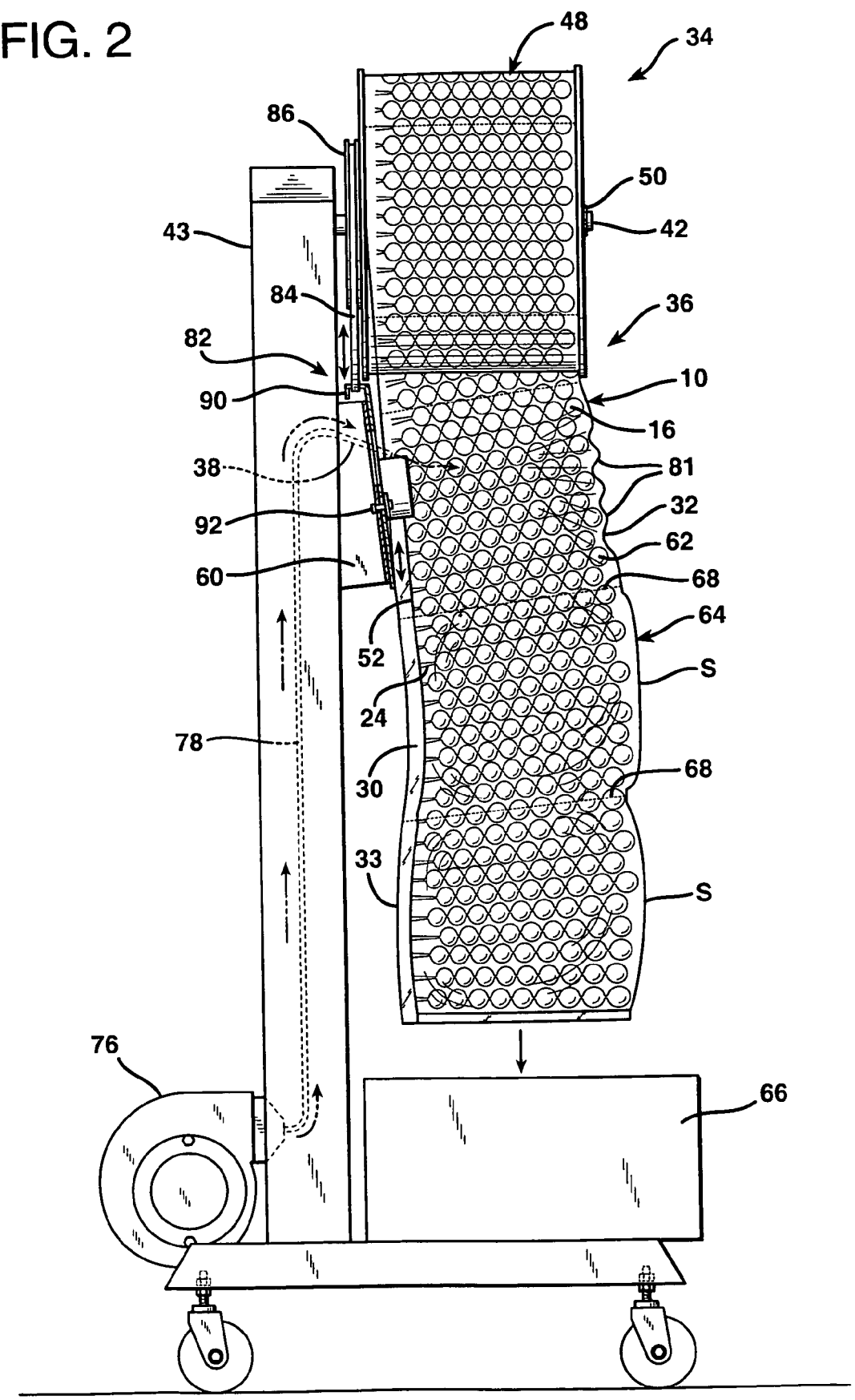
FIG. 2 is a side elevational view of an apparatus of the invention.
Figure 3:
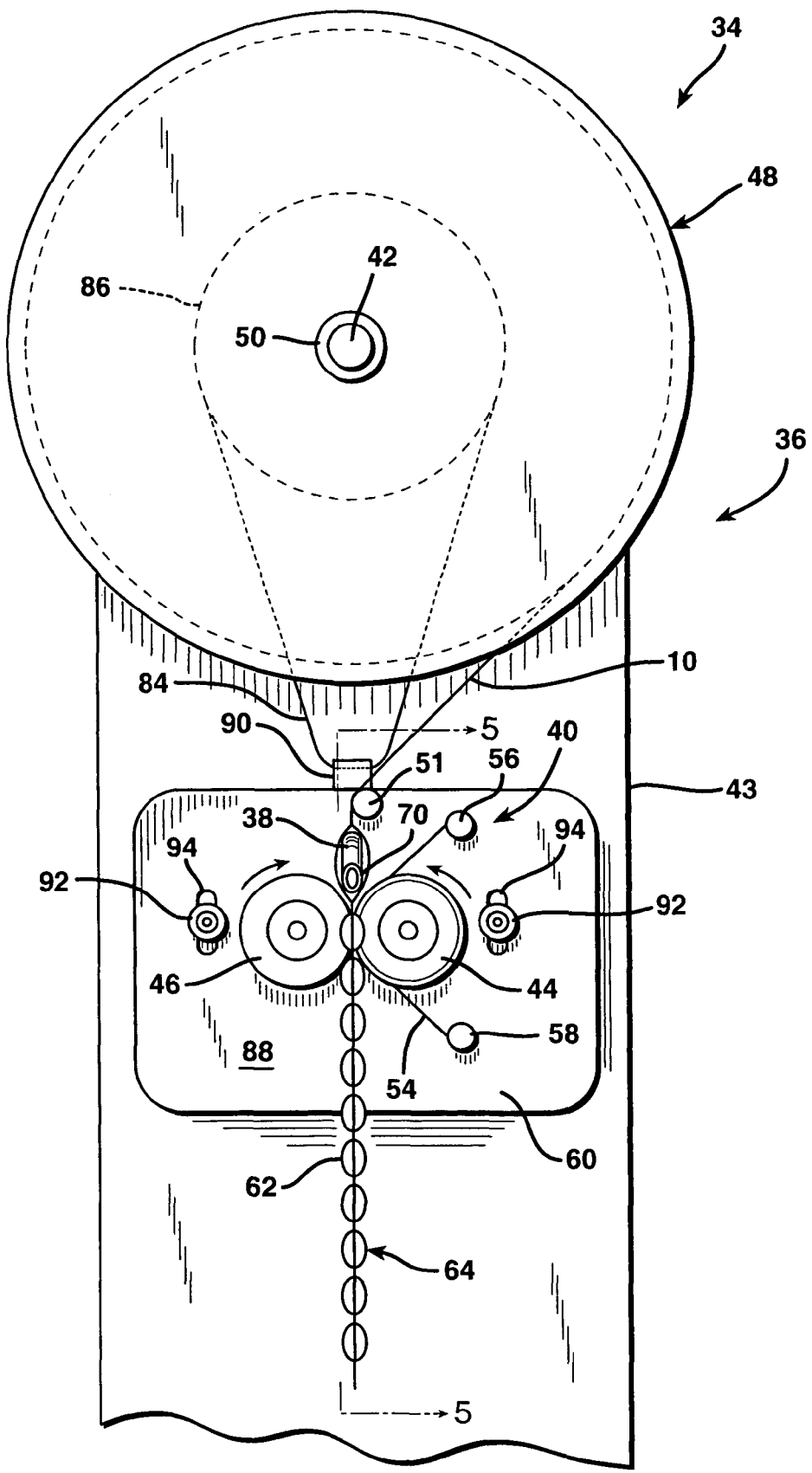
FIG. 3 is a partial front view of the apparatus shown in FIG. 2.
Figure 4:
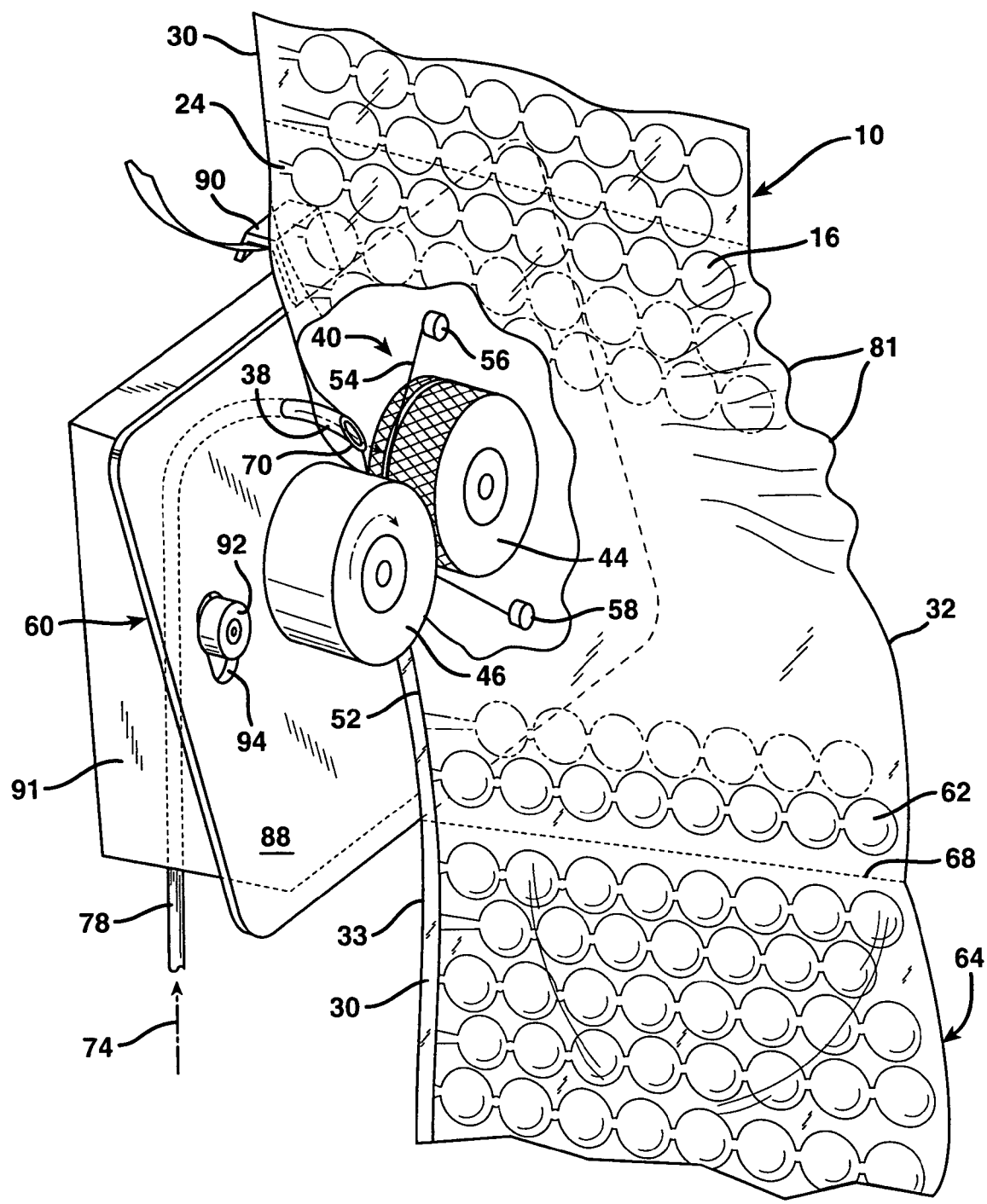
FIG. 4 is a perspective view of the apparatus shown in FIGS. 2 and 3, further showing the positioning of a nozzle for inflation of a web as shown in FIG. 1.

Referring now to FIGS. 2-4, an apparatus 34 for inflating web 10 will be described. Apparatus 34 includes a conveying mechanism, generally indicated at 36, an inflation nozzle 38, and a sealing device 40. Conveying mechanism 36 conveys web 10 along a path of travel as shown, which allows inflation nozzle 38 to sequentially inflate each of chambers 16 and sealing device 40 to seal closed the inflated chambers. The "path of travel" (or "travel path") of web 10 refers to the route that such web traverses while being conveyed through apparatus 34 in this manner, as indicated by the shape assumed by the web as it is manipulated by the conveying mechanism.

Conveying mechanism 36 may include a shaft 42 mounted to housing 43, a pair of adjacent, counter-rotatable cylinders 44 and 46, and a guide roll 51. Web 10 is preferably provided in the form of a supply roll 48, which may be wound on spool 50 and mounted on shaft 42. Web 10 is advanced, i.e., unwound, from supply roll 48, with guide roll 51 directing the web between cylinders 44, 46 in a substantially vertical direction as shown. Cylinders 44, 46 are capable of engaging and moving web 10 along its travel path through apparatus 34 when a portion of the film web passes between the cylinders and the cylinders rotate in the directions indicated in FIG. 3 against the web. The counter-rotation of the cylinders against web 10 exerts sufficient force on web 10 to cause rotation of supply roll 48, thus dispensing web 10 for travel through apparatus 34 as shown. Preferably, at least one of cylinders 44, 46 has an uneven surface, e.g., a knurled or abraded surface as shown in FIG. 4, or a grooved or inwardly threaded surface. It is also preferred that the opposing cylinder, i.e., opposite the cylinder having an uneven surface, is formed from a relatively resilient or pliable material, such as silicone or rubber, which may have grooves in the surface thereof.

One or both cylinders 44, 46 are preferably coupled to an electrical, hydraulic, or pneumatic motor (not shown), having a rotational output to cause the cylinders to rotate. For example a single motor, such as an electrical "gear head" motor, may be axially coupled to cylinder 44, which causes cylinder 44 to rotate when power (e.g., electricity) is supplied to the motor. When cylinder 44 is positioned in abutting relationship with cylinder 46 as shown, the rotation of cylinder 44 causes cylinder 46 to rotate. Alternatively, a motor could be coupled instead to cylinder 46 or, as a further alternative, separate drive motors could be coupled to each of cylinders 44, 46.

Sealing device 40 is preferably positioned immediately downstream from inflation nozzle 38, so that each chamber 16 may be sealed closed immediately after being inflated and/or contemporaneous with inflation. The sealing device 40 preferably seals closed the inflation ports 24 of each chamber 16 by forming a continuous longitudinal seal 52 as shown.

A preferred sealing device is disclosed in commonly-assigned, copending patent application Ser. No. 09/760,105 entitled DEVICE FOR SEALING TWO PLIES OF FILM TOGETHER, PARTICULARLY FOR ENCLOSING A FOAMABLE COMPOSITION IN A FLEXIBLE CONTAINER (Sperry et al.), filed on Jan. 12, 2001, the disclosure of which is hereby incorporated herein by reference. Such a sealing device, as perhaps best shown in FIG. 4 (wherein a portion of web 10 has been broken away for clarity), includes an electrically conductive heating element 54 having a first end secured to a first node 56 and a second end secured to a second node 58. Heating element 54 is positioned between cylinders 44, 46 such that cylinder 44 rotates against the heating element, which is stationary and fixed to platform 60 via nodes 56 and 58. Cylinder 44 preferably includes a circumferential groove in which heating element 54 'rides' as cylinder 44 rotates against the heating element 54. Cylinder 46 also rotates against the heating element, but only at the nip (point of tangential contact) between the cylinders.

The inflation port 24 of each inflatable chamber 16 is sealed closed when conveying mechanism 36 brings web 10 into moving contact with heating element 54 between cylinders 44, 46 and sufficient current is caused to flow through the heating element that it (i.e., the heating element 54) heats to a sealing temperature sufficient to form longitudinal heat seal 52 between juxtaposed 12, 14 of web 10. As noted above, such sealing of inflation ports 24 occurs shortly after inflation of the chamber 16 associated with each port. In this manner, gas from inflation nozzle 38 is trapped, i.e., enclosed, within each chamber, resulting in the formation of inflated chambers 62.

When sheets 12, 14 of web 10 are formed from a thermoplastic film, the sealing temperature necessary to form longitudinal seal 52 is that which causes the film sheets 12, 14 to weld or fuse together by becoming temporarily fully or partially molten in the area of contact with the heating element 54. Such temperature, i.e., the "sealing temperature," may readily be determined by those of ordinary skill in the art without undue experimentation for a given application based on, e.g., the composition and thickness of the film sheets to be sealed, the speed at which the film sheets move against the heating element, and the pressure at which the film sheets and heating element are urged together between cylinders 44, 46. As an example, when sheets 12, 14 comprise polyethylene-based films ranging in thickness from about 0.001 to about 0.003 inch (for a combined, juxtaposed thickness ranging from 0.002 to 0.006 inch), the sealing temperature to which heating element 54 is heated preferably ranges from about 300 to about 500° F.

Heating element 54 may be any device capable of heating to a predetermined temperature sufficient to heat-seal sheets 12, 14 together. Suitable types of devices for heating element 54 include one or more wires comprising metal and/or other electrically conductive materials; one or more ribbons comprising metal; circuit-printed plastic ribbons, e.g., metal printed on a plastic substrate comprising polyethylene terephthalate (PET); and other suitable electrically conductive devices.

The drawings illustrate heating element 54 in the form of a wire. When heating element 54 assumes such a form, the wire may have any desired cross-sectional shape, including round, square, oval, rectangular, etc.

An alternative sealing device which may be used in the apparatus 34 in accordance with the present invention employs a heating element that is completely wrapped about the outer circumference of a cylinder, as disclosed in U.S. Pat. No. 5,376,219, the disclosure of which is incorporated by reference herein. As a further alternative to employing the sealing device 40 as described above, one or both sheets 12, 14 may include strips of a bonding material located within inflation ports 24. Such a bonding material, e.g., an adhesive or cohesive material, forms a seal when sheets 12, 14 are pressed together between cylinders 44, 46. Further details concerning this means for sealing two film plies together are described in copending U.S. Ser. No. 09/591,830, filed Jun. 12, 2000 and entitled METHOD FOR ENCLOSING A FOAMABLE COMPOSITION IN A FLEXIBLE BAG (Oberle et al.), the disclosure of which is hereby incorporated herein by reference.

The completed cushioning material 64, formed by a series of inflated and sealed chambers 62, may be collected in a basket or other suitable container as indicated at 66 in FIG. 2, until needed for use. If desired, web 10 may include one or more lines of weakness 68 that allow sections "S" of predetermined length to be removed from web 10. In this manner, such sections S of completed cushioning material 64 may be removed for individual use. Transverse lines of weakness 68 preferably comprise a series of perforations as shown, and extend from closed edge 32 to and through flanges 30. As an alternative to providing perforation lines 68, a severing device may be included to sever, e.g., via mechanical means and/or heat, sections of completed cushioning material from the web, wherein such sections may have any desired length of fixed or variable dimension.

With continuing reference to FIGS. 2-4, and with additional reference to FIGS. 5-6, the sequential inflation of chambers 16 will be described in further detail. Inflation nozzle 38 is within the travel path of web 10 and, specifically, is positioned for placement between the longitudinal flanges 30 of web 10. This may be seen in FIGS. 4-6 (a portion of upper sheet 12 has been broken away for clarity in FIGS. 5-6). As used herein with reference to web 10, the term "longitudinal" refers to the direction of conveyance of web 10 through apparatus 34 as indicated in the drawings; "longitudinal" also corresponds to the direction of the length dimension (longest dimension) of web 10.

Inflation nozzle 38 comprises a gas outlet port 70 at distal end 72 for injection of gas 74 into the inflatable chambers 16. A preferred gas is air, although other gases may suitably be employed such as, e.g., $CO_2$, $N_2$, etc. Gas 74 may be supplied by an air compressor 76 mounted on apparatus 34 as shown in FIG. 2, or from other sources such as compressed gas cylinders, 'plant air' (compressed air from a fixed, centralized source), etc. Gas 74 may be delivered to inflation nozzle 38 via an internal tube 78 that runs through housing 43 as shown. Tube 78 may be coupled to nozzle 38 via mounting block 80, which is secured to platform 60 as shown in FIGS. 5-6.

Figure 5:
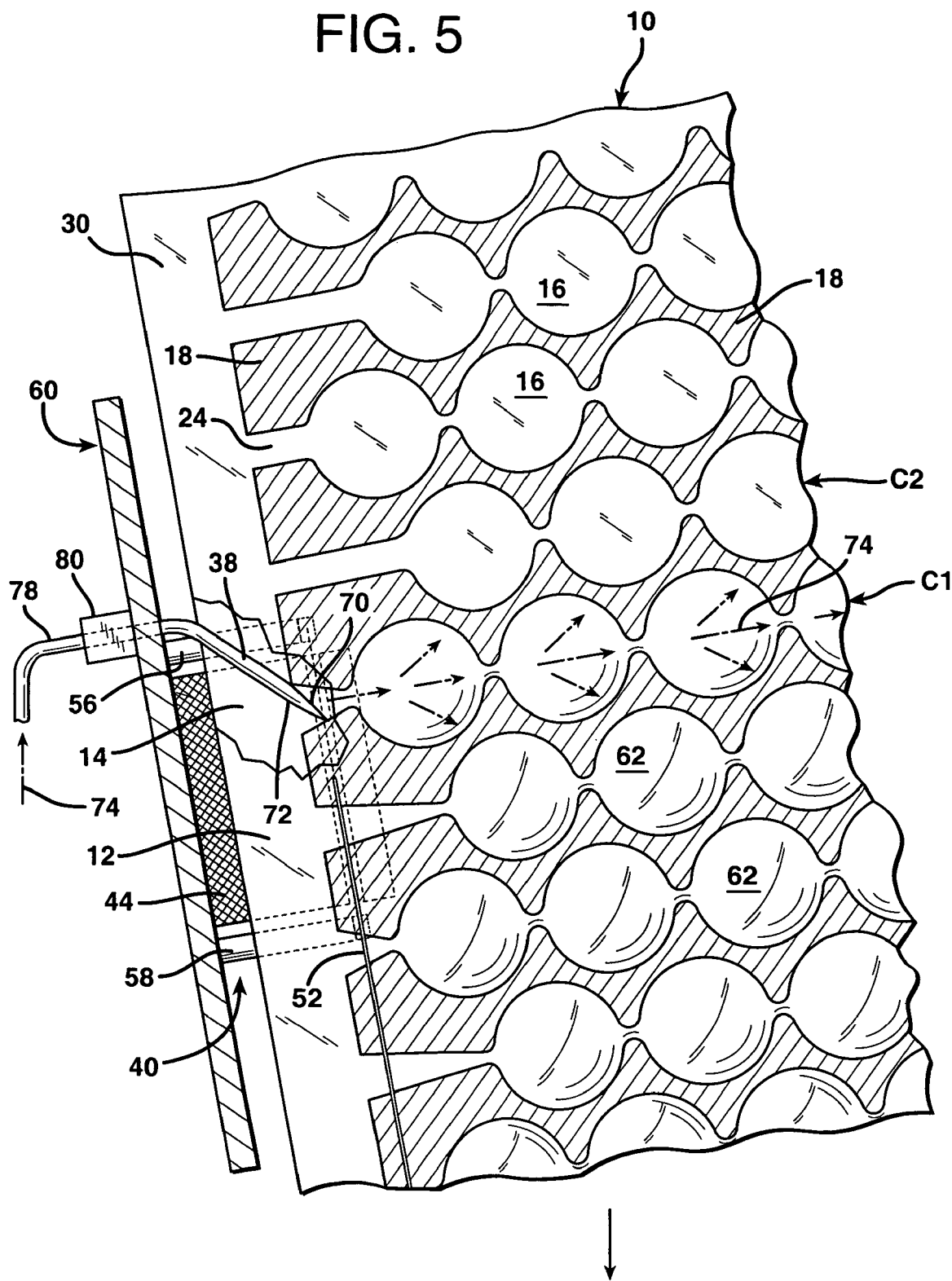
FIG. 5 is a partial cross-sectional view taken along lines 5-5 in FIG. 3.
Figure 6:
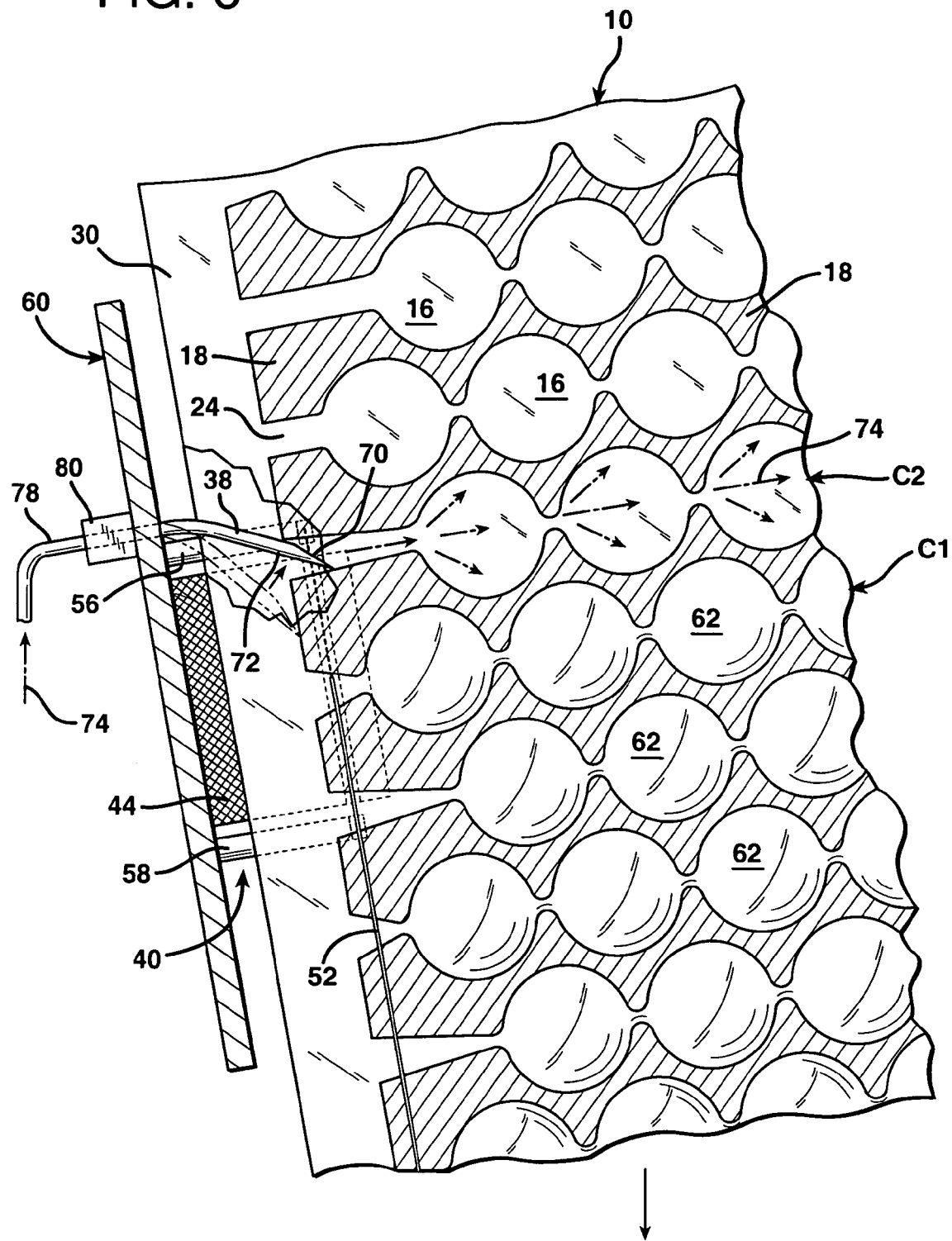
FIG. 6 is a partial cross-sectional view similar to that shown in FIG. 5, further showing the inflation nozzle moving to an adjacent inflation port of the web to begin inflation of the associated chamber.

With particular reference to FIGS. 5-6, it may be seen that inflation nozzle 38 is adapted to position gas outlet port 70 closely adjacent to inflation ports 24 and intermittent seals 18. In this manner, while conveying mechanism 36 conveys web 10 along its travel path, inflation nozzle 38 moves continuously and longitudinally between flanges 30 and sequentially inflates chambers 16 by introducing gas 74 into their respective inflation ports 24. Preferably, the position of inflation nozzle 38 is relatively fixed while web 10 moves longitudinally past the nozzle.

The positioning of gas outlet port 70 closely adjacent to inflation ports 24 may be achieved by adapting at least a portion of inflation nozzle 38, preferably distal end 72, to move in response to movement of web 10 past the nozzle. Additionally, distal end 72 of the inflation nozzle is preferably biased towards, i.e., urged against, inflation ports 24 and intermittent seals 18. Consequently, distal end 72 is caused to move as a result of contact between the distal end and intermittent seals 18 as web 10 moves past inflation nozzle 38. Such movement of the distal end is essentially oscillatory. At the upper end of the oscillation, the inflation nozzle begins to inflate a chamber. At the lower end of the oscillation, the distal end of the nozzle, which has been pulled downwards towards the nip between cylinders 44 and 46 (where the formation of longitudinal seal 52 begins), the distal end disengages with the now-inflated chamber and rebounds upwards towards the next, adjacent chamber to be inflated.

The lower end of the oscillation is shown in FIG. 5, wherein chamber C1 has been fully inflated by gas 74 from inflation nozzle 38 (C1 is an arbitrary designation of the chamber 16 with which inflation nozzle 38 is engaged in FIG. 5). At this point in the oscillation, chamber C1 disengages from the inflation nozzle by moving downwards and out of reach of distal end 72. Preferably, such point in the lower end of the oscillation of inflation nozzle 38 places distal end 72 and outlet port 70 just above the nip between cylinders 44, 46. This advantageously allows the chamber to achieve a high degree of inflation by sealing the chamber closed just after it disengages with nozzle 38, i.e., when inflation port 24 of chamber C1 moves through the nip between cylinders 44, 46 and is sealed by heating element 54 of sealing device 40, which continuously creates longitudinal seal 52.

When chamber C1 disengages from inflation nozzle 38, the nozzle rebounds upwards until it is engaged by the inflation port 24 of the next, adjacent chamber 16 to be inflated, which has been designated C2 in FIGS. 5-6. In the meantime, chamber C1 has become an inflated chamber 62 by virtue of being sealed closed by sealing device 40.

FIG. 6 shows the inflation nozzle at the upper end of its oscillation, i.e., just after being engaged by chamber C2. As a result of being biased towards inflation ports 24 and intermittent seals 18, the distal end 72 of the inflation nozzle extends into the inflation port 24 of chamber C2 as the nozzle begins to inflate such chamber. This advantageously facilitates full inflation of the chambers by ensuring that most of the gas 74 is injected into the chambers instead of being blown back out between flanges 30. This is particularly important during the initial stage of inflating a chamber, when adhesion between sheets 12, 14 can impede inflation. Further, by virtue of being movable, the distal end of the nozzle remains in contact with the inflation port 24 of chamber C2 as chamber C2 moves towards cylinders 44, 46 so that outlet port 70 remains in fluid communication with the chamber throughout the oscillatory cycle of the nozzle. Such mobility of the inflation nozzle not only facilitates full inflation of the chambers, but it allows web 10 to be conveyed continuously, rather than intermittently, through apparatus 34 as the chambers are sequentially inflated.

Inflation nozzle 38 is preferably in the form of a tube as shown, constructed from a relatively stiff but resilient material to allow movement as described hereinabove. Preferred materials from which the nozzle may constructed include various polymeric materials, such as nylon, polyethylene, polypropylene, Teflon, etc. It is also preferred that the distal end 72 be angled as shown in FIGS. 5-6 so that outlet port 70 has an oval shape.

Other movable forms for inflation nozzle 38 are also possible, such as relatively rigid nozzles that move, e.g., pivotally, translationally, or rotationally, in response to movement of web 10 past the nozzle. As a further alternative, the inflation nozzle may be unmovable, i.e., have no movable components. In this instance, the nozzle may have a fin or wedge shape so that it and, specifically, the outlet port thereof, can be placed as close as possible to the nip between cylinders 44, 46. Two or more outlet ports may be employed if desired.

Preferably, gas 74 is introduced by inflation nozzle 38 into chambers 16 at greater than atmospheric pressure ranging, e.g., from about 1 to about 25 psi above atmospheric pressure, more preferably from about 2 to about 10 psi. This may be achieved when compressor 76 generates a gas pressure of about 5 to about 80 psi, more preferably from about 10 to about 50 psi, and most preferably from about 15 to about 35 psi. It is to be understood that the foregoing represent preferred ranges for the particular inflation nozzle 38 as illustrated, and that other gas pressures may be more suitable if other types of inflation nozzles are employed. Further, the applied gas pressure from inflation nozzle may be adjusted as necessary to provide a desired level of inflation/firmness in inflated chambers 62.

Figure 7:
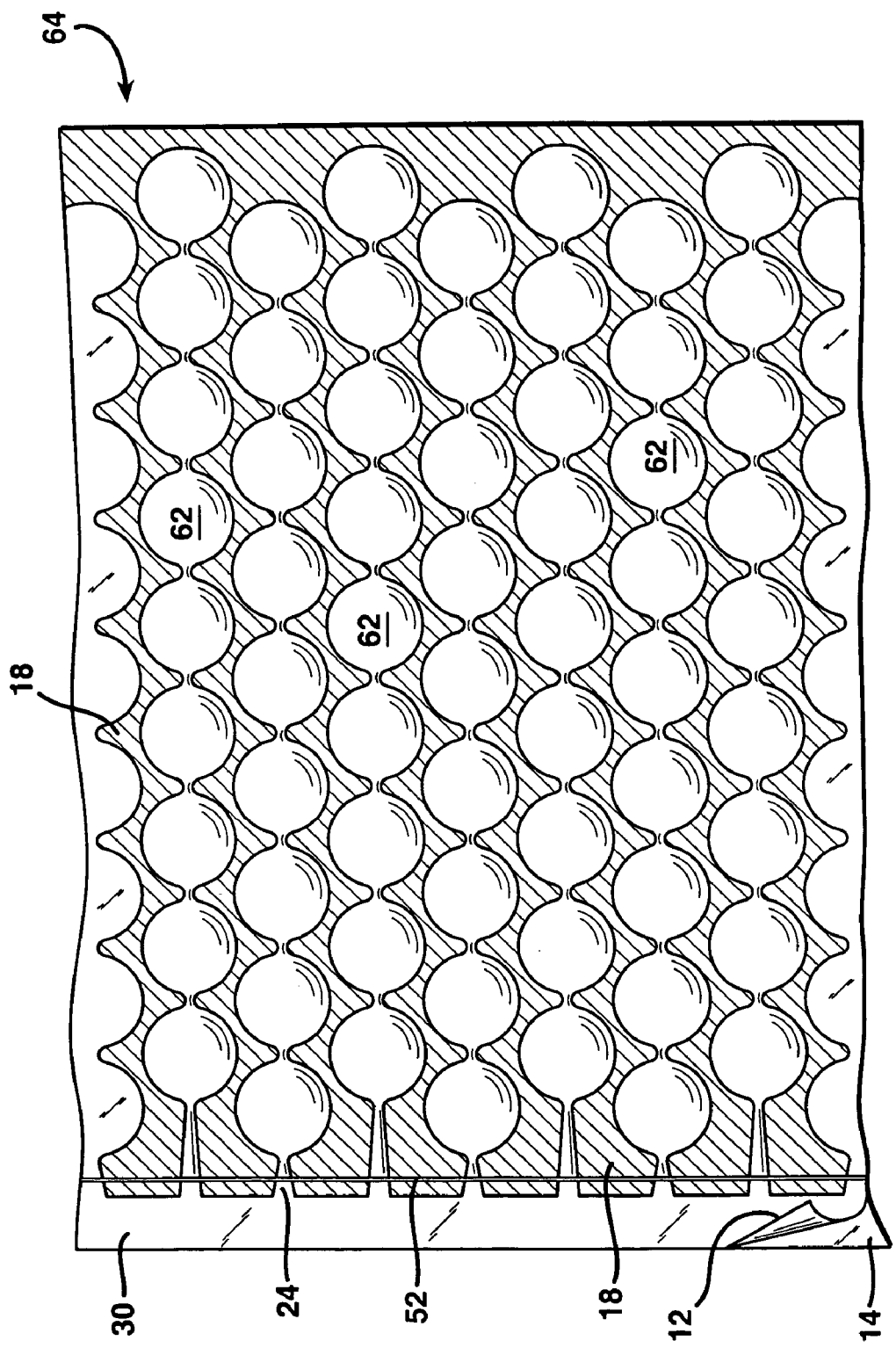
FIG. 7 is a plan view of an inflated web of the invention showing the positioning of heat seals formed after inflation.

Referring now to FIG. 7, the completed, i.e., inflated, cushioning material 64 may be seen, with a series of inflated chambers 62, maintained in such inflated state by virtue of longitudinal seal 52, which seals closed each of the inflation ports 24.

With reference now to FIGS. 2 and 4, another feature of the invention will be described. It has been found that the inflation of chambers 16 may be facilitated by the additional step of effecting relative movement between the opposing longitudinal edges of web 10, i.e., closed edge 32 and opposing edge 33 at which the open edges of flanges 30 terminate. Such relative movement decreases the distance between the longitudinal edges of the web as it is conveyed past the inflation nozzle during inflation. It has been found that this additional step can facilitate consistent and reliable inflation of the chambers. The decrease in distance can be accomplished by urging edge 33 toward the closed longitudinal edge 32 such that a crease 81 forms at edge 32. Such creasing is believed to facilitate inflation of containers 16 by making them more readily deformable as occurs during inflation, i.e., from an essentially two-dimensional shape prior to inflation to a three-dimensional shape as a result of inflation. Additionally, the creasing or decrease in distance between the longitudinal edges may also facilitate fuller inflation of the web chambers.

Edge 33 may be urged toward closed longitudinal edge 32 by mounting platform 60 on housing 43 at an angle relative to the generally vertical direction of closed longitudinal edge 32, i.e., relative to the direction of travel of closed longitudinal edge 32 as web 10 is conveyed through apparatus 34. Such angle of platform 60 serves to direct edge 33 towards closed longitudinal edge 32 as web 10 is conveyed past the platform. Platform 60 may have any desired angle ranging, e.g., between 0° and 90°, with 0° being vertical (or parallel to the direction in which longitudinal edges 32, 33 would otherwise extend from supply roll 48 but for the diversion in direction caused by platform 60) and 90° being horizontal (or perpendicular to the direction in which longitudinal edges 32, 33 would otherwise extend from supply roll 48). Preferably, the angle of platform 60 ranges between about 10 and about 20° and, more preferably, between about 1° and 10°.

In addition or alternatively, counter-rotatable cylinders 44, 46 may be oriented at an angle with respect to the generally vertical direction of closed longitudinal edge 32. As shown, the cylinders 44, 46 may be angled by mounting them on angled platform 60. Preferably, inflation nozzle 38 is positioned immediately upstream of cylinders 44, 46 as also shown. It has been found that the positioning of the cylinders at an angle immediately downstream of the inflation nozzle provides the desired urging of the flange edge 33 toward the closed edge 32 in that section of the web being conveyed past the inflation nozzle, thereby providing the desired improvement in inflation consistency and reliability.

Further details concerning the angling of the counter-rotatable drive system is disclosed in commonly assigned, copending U.S. application Ser. No. 09/782,766, entitled "Apparatus And Method for Forming Inflated Containers", filed Feb. 13, 2001, the disclosure of which is incorporated herein by reference.

A further aspect of the invention concerns the tension in web 10. At least some tension in the web is beneficial in that tension has, in general, been found to provide better tracking of the web through the apparatus. For example, if the tension on the web is too low it may travel out of the nip between cylinders 44, 46 or disengage from inflation nozzle 38. In addition, tension facilitates close slidable contact between flanges 30 and inflation nozzle 38, which generally results in better concentration of the gas flow 74 into the inflation ports 24 of chambers 16. Too much tension would be undesirable, however, because this may prevent or impede inflation of chambers 16.

In many instances, the resistance to rotation of supply roll 48 and the frictional resistance caused by the movement of web 10 over guide roll 51 provides sufficient counter-resistance to the movement induced by cylinders 44, 46 to result in a desired tensioning of web 10. In other cases, however, it may desirable to include in apparatus 34 a device 82 for controlling the tension in the longitudinal flanges 30 to achieve a consistent and desired amount of tension. Such a device is best illustrated in FIGS. 2-3, and includes a frictional member 84 that is frictionally engageable with supply roll 48, i.e., capable of applying to supply roll 48 a frictional force that opposes the rotation of the supply roll. Frictional member 84 may take the form of a band, wire, or arm that is biased against supply roll 48, or any other element that acts as a brake against the rotation of supply roll 48. The frictional member may be frictionally engageable with supply roll 48 either directly or indirectly, i.e., it may contact the supply roll directly or may contact an auxiliary component that is associated with the supply roll and rotationally coupled thereto, such as friction wheel 86 as shown. Thus, frictional member 84 may be frictionally engaged with friction wheel 86, which is, in turn, rotationally coupled to supply roll 48 such that supply roll 48 cannot rotate on shaft 42 without also causing friction wheel 86 to rotate. Frictional member 84 thus acts as a brake or drag against the rotation of friction wheel 86, and therefore also against the rotation of supply roll 48, particularly when a weighted object is suspended from the frictional member or the frictional member 84 is otherwise biased away from friction wheel 86, e.g., with a spring, in order to increase the frictional force applied against the wheel 86 by frictional member 84.

Preferably, the tension-control device 82 also includes some means for varying the frictional force applied to supply roll 48 by the frictional member 84 in response to changes in the tension in web 10. Such means may include a movable support plate 88, which preferably forms the outer surface of platform 60 and has mounted thereto the cylinders 44 and 46, sealing device 40 and inflation nozzle 38 as shown. Movable plate 88 preferably is movable towards and away from supply roll 48, and also is attached to friction member 84, e.g., via hook 90. Movable plate 88 may be mounted to the base 91 of platform 60 with a pair of retaining pins 92, which pass through slots 94 in the movable plate and are attached to base 91 as shown. Slots 94 are shaped to allow movable plate to move both towards and away from supply roll 48.

Movement of the movable plate 88 towards supply roll 48 causes a decrease in the frictional force applied to the supply roll by frictional member 84. That is, the movable plate 88 with cylinders 44, 46 mounted thereon has a weight ranging from, e.g., about 1-10 pounds, and is suspended from friction member 84 via hook 90. This weight thus causes frictional member 84 to exert a frictional force against the rotation of friction wheel 86 and, coupled thereto, supply roll 48. When the plate 88 is caused to move towards supply roll 48, the amount of frictional force against the rotation of the supply roll decreases. For reasons which are more fully explained in the above-incorporated U.S. application Ser. No. 09/782,766, this arrangement decreases variation in the tension in web 10 that is otherwise caused by the variable force required to withdraw web 10 from supply roll 48 as the web supply on the roll, and therefore the diameter thereof, decreases.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. An apparatus for inflating a web, comprising:
   a) a mechanism for conveying an inflatable web along a path of travel, the web comprising
      (1) two sheets having inner surfaces sealed to each other in a pattern defining a series of inflatable chambers of predetermined length, each of the chambers having at least one change in width over their length,
      (2) an inflation port located at a proximal end of each chamber, each said inflation port being formed by intermittent seals between said sheets, and
      (3) longitudinal flanges formed by a portion of each of said sheets that extend beyond said inflation ports and intermittent seals, said flanges having a pair of open, unsealed edges;
   b) an inflation nozzle within said travel path and positioned for placement between the longitudinal flanges of the web, said inflation nozzle comprising a gas outlet port for injection of gas into the inflatable chambers and being adapted to position said gas outlet port closely adjacent to the inflation ports and intermittent seals so that, as said conveying mechanism conveys the web along said travel path, said inflation nozzle moves longitudinally between the flanges to inflate the series of chambers sequentially by the introduction of gas into their respective inflation ports, wherein at least a portion of said inflation nozzle is adapted to move as the web moves past said nozzle; and c) a device for sealing the inflation ports.

2. The apparatus of claim 1, wherein said inflation nozzle comprises a distal end that includes said gas outlet port, said distal end being adapted to move in response to movement of said web past said nozzle.

3. The apparatus of claim 2, wherein said distal end of said inflation nozzle is biased towards said inflation ports and intermittent seals.

4. The apparatus of claim 3, wherein said movement of said distal end is caused by contact between said distal end and said intermittent seals as said web moves past said inflation nozzle.

5. The apparatus of claim 1, wherein said conveying mechanism includes a pair of adjacent, counter-rotatable cylinders capable of engaging and moving said inflatable web along said travel path.

6. The apparatus of claim 5, wherein said inflation nozzle is positioned immediately upstream of said cylinders.

7. The apparatus of claim 1, further including a device for controlling tension in said longitudinal flanges.

8. The apparatus of claim 1, wherein said sealing device is positioned immediately downstream from the inflation nozzle.

9. An apparatus for inflating a web, comprising:
   a) a mechanism for conveying an inflatable web along a path of travel, the web comprising
      (1) two sheets having inner surfaces sealed to each other in a pattern defining a series of inflatable chambers of predetermined length, each of the chambers having at least one change in width over their length,
      (2) an inflation port located at a proximal end of each chamber, each said inflation port being formed by intermittent seals between said sheets,
      (3) longitudinal flanges formed by a portion of each of said sheets that extend beyond said inflation ports and intermittent seals, said flanges having a pair of open, unsealed edges, and
      (4) opposing first and second longitudinal edges spaced by a predetermined distance, said longitudinal flanges located at said first longitudinal edge;
   b) an inflation nozzle within said travel path and positioned for placement between the longitudinal flanges of the web, said inflation nozzle comprising a gas outlet port for injection of gas into the inflatable chambers and being adapted to position said gas outlet port closely adjacent to the inflation ports and intermittent seals so that, as said conveying mechanism conveys the web along said travel path, said inflation nozzle moves longitudinally between the flanges to inflate the series of chambers sequentially by the introduction of gas into their respective inflation ports;
   c) means for effecting relative movement between said first and second longitudinal edges to decrease the distance therebetween during inflation; and
   d) a device for sealing the inflation ports.

10. The apparatus of claim 9, wherein said means for effecting relative movement comprises urging said first longitudinal edge towards said second longitudinal edge such that a crease forms at said second longitudinal edge.

11. The apparatus of claim 10, wherein said means for effective relative movement comprises a platform positioned at an angle, relative to said second longitudinal edge, which directs said first longitudinal edge towards said second longitudinal edge as said inflatable web is conveyed along said travel path.

12. An apparatus for inflating a web, comprising:
   a) a mechanism for conveying an inflatable web along a path of travel, the web comprising
      (1) two sheets having inner surfaces sealed to each other in a pattern defining a series of inflatable chambers of predetermined length, each of the chambers having at least one change in width over their length,
      (2) an inflation port located at a proximal end of each chamber, each said inflation port being formed by intermittent seals between said sheets, and
      (3) longitudinal flanges formed by a portion of each of said sheets that extend beyond said inflation ports and intermittent seals, said flanges having a pair of open, unsealed edges;
   b) an inflation nozzle within said travel path and positioned for placement between the longitudinal flanges of the web, said inflation nozzle comprising a gas outlet port for injection of gas into the inflatable chambers and being adapted to position said gas outlet port closely adjacent to the inflation ports and intermittent seals so that, as said conveying mechanism conveys the web along said travel path, said inflation nozzle moves longitudinally between the flanges to inflate the series of chambers sequentially by the introduction of gas into their respective inflation ports;
   c) a device for sealing the inflation ports; and
   d) a device for controlling tension in said longitudinal flanges such that said flanges are in close, slidable contact with said inflation nozzle without preventing inflation of said chambers.

* * * * *